(12) United States Patent
Lim et al.

(10) Patent No.: US 8,711,957 B2
(45) Date of Patent: Apr. 29, 2014

(54) APPARATUS AND METHOD FOR TRANSMITTING AND RECEIVING DATA

(75) Inventors: Jong Soo Lim, Daejeon (KR); Sun Hyoung Kwon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 383 days.

(21) Appl. No.: 13/241,483

(22) Filed: Sep. 23, 2011

(65) Prior Publication Data

US 2012/0076233 A1    Mar. 29, 2012

(30) Foreign Application Priority Data

Sep. 28, 2010  (KR) .................. 10-2010-0093962
Aug. 19, 2011  (KR) .................. 10-2011-0082983

(51) Int. Cl.
*H04K 1/10*  (2006.01)
*H04L 27/28*  (2006.01)

(52) U.S. Cl.
USPC ........... 375/260; 375/296; 375/297; 375/316; 375/295; 370/208; 370/209; 370/210; 370/204; 455/101

(58) Field of Classification Search
USPC .................. 375/260, 296, 297, 316, 295; 370/208–210, 204; 455/101
See application file for complete search history.

(56) References Cited

U.S. PATENT DOCUMENTS

| | | | | |
|---|---|---|---|---|
| 8,116,695 | B2* | 2/2012 | Feder et al. | 455/101 |
| 2006/0285602 | A1* | 12/2006 | Lim | 375/260 |
| 2006/0291431 | A1* | 12/2006 | Pajukoski et al. | 370/335 |
| 2008/0075191 | A1* | 3/2008 | Haartsen | 375/285 |
| 2010/0110875 | A1* | 5/2010 | No et al. | 370/210 |
| 2012/0176886 | A1* | 7/2012 | Yu | 370/210 |

OTHER PUBLICATIONS

Kim, Sang-Woo et al., "PAPR Reduction Method Using SLM-based WHT and DSI," Dept. of Electronic Engineering and Research Institute of Computer, Information & Communication, Changbuk National University, pp. 1147-1154 (2005).

* cited by examiner

*Primary Examiner* — Phuong Phu (74) *Attorney, Agent, or Firm* — H.C. Park & Associates, PLC (57) ABSTRACT

A data transmission apparatus is provided. A symbol mapper performs symbol mapping on information about an optimum key index that instructs a modified Walsh-Hadamard matrix that causes a minimum peak-to-average power ratio and generates a plurality of key symbols. A modified Walsh-Hadamard transformer generates a plurality of modified Walsh-Hadamard-transformed data symbols by performing modified Walsh-Hadamard transform on a plurality of data symbols according to a modified Walsh-Hadamard matrix that an optimum key index instructs. An inverse Fourier transformer generates a plurality of inverse Fourier-transformed symbols by performing inverse Fourier transform on a plurality of key symbols and a plurality of modified Walsh-Hadamard-transformed data symbols. A transmitter transmits a plurality of inverse Fourier-transformed symbols to a channel through at least one antenna.

20 Claims, 9 Drawing Sheets

APPARATUS AND METHOD FOR TRANSMITTING AND RECEIVING DATA

CROSS-REFERENCE TO RELATED APPLICATION

This application claims priority to and the benefit of Korean Patent Application Nos. 10-2010-0093962 filed in the Korean Intellectual Property Office on Sep. 28, 2010 and 10-2011-0082983 filed in the Korean Intellectual Property Office on Aug. 19, 2011, the entire contents of which are incorporated herein by reference.

BACKGROUND (a) Field

The present invention relates to a method and apparatus for transmitting and receiving data, and more particularly, to a method and apparatus for transmitting and receiving orthogonal frequency-division multiplexing (OFDM) data.

(b) Description of the Related Art

An OFDM method is embodied through a simple equalizer, and has strong characteristics in multipath fading and thus in recent wireless communication, the OFDM method has been widely used. The OFDM method is selected and used in several wireless communication systems such as a wireless local area network (WLAN), a wireless metropolitan area network (WMAN), digital audio broadcast (DAB), and digital video broadcast (DVB).

Hereinafter, a conventional OFDM transmitter 10 and OFDM receiver 20 will be described with reference to FIGS. 1 and 2.

Figure 1:
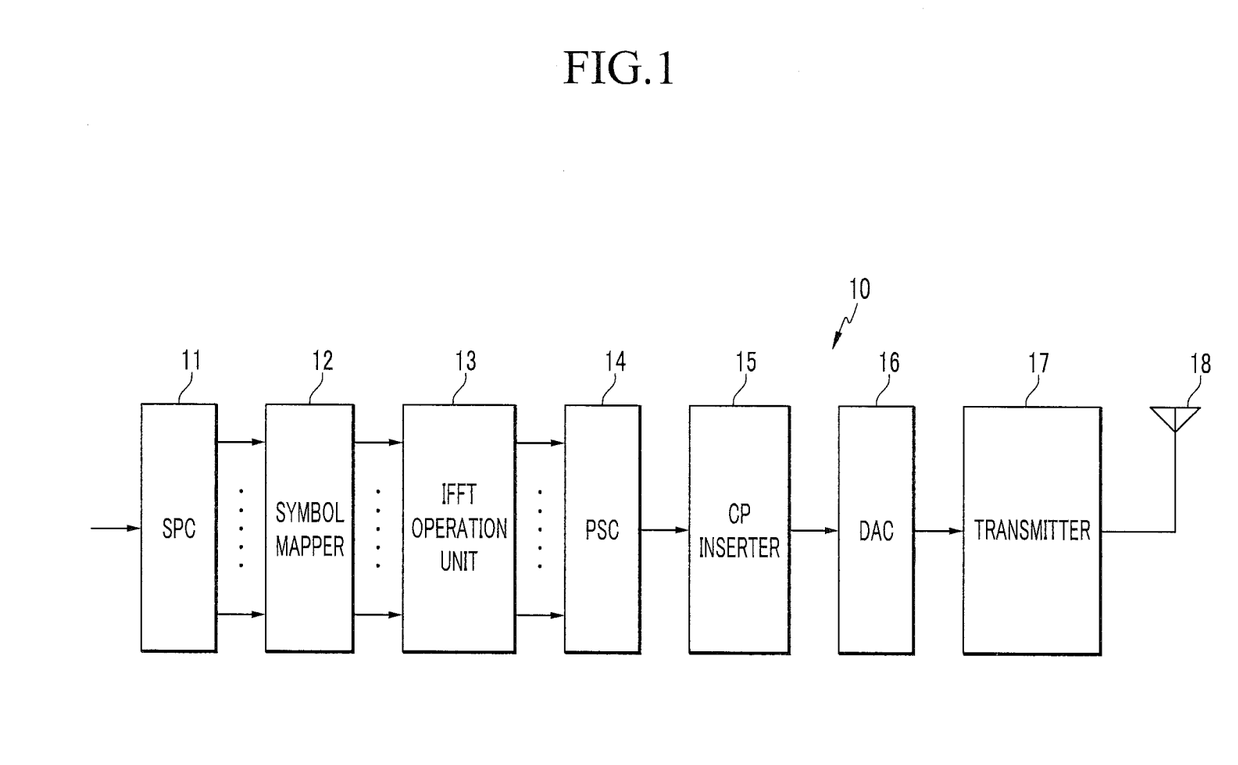
FIG. 1 is a block diagram illustrating a conventional OFDM transmitter.

FIG. 1 is a block diagram illustrating a conventional OFDM transmitter.

As shown in FIG. 1, the conventional OFDM transmitter 10 includes a serial-to-parallel converter (hereinafter, an SPC) 11, a symbol mapper 12, an inverse fast Fourier transformer (hereinafter, an IFFT operation unit) 13, a parallel-to-serial converter (hereinafter, a PSC) 14, a cyclic prefix inserter (hereinafter, a CP inserter) 15, a digital-to-analog converter (hereinafter, a DAC) 16, a transmitter 17, and at least one transmitting antenna 18.

The SPC 11 converts a plurality of serial binary data signals to a plurality of parallel binary data signals.

The symbol mapper 12 generates a plurality of digital-modulated data symbols by performing digital modulation such as binary phase shift keying (BPSK), quadrature amplitude modulation (QAM), 16-QAM, and 64-QAM on a plurality of parallel binary data signals that are output by the SPC 11.

The IFFT operation unit 13 generates a plurality of inverse-fast-fourier-transformed symbols (IFFT symbols) by performing IFFT on a plurality of digital-modulated data symbols that are outputs by the symbol mapper 12.

The PSC 14 outputs a plurality of IFFT symbols that are output in parallel by the IFFT operation unit 13 in series.

The CP inserter 15 adds a signal of cyclic prefix to a front portion of a plurality of IFFT symbols that are output in series by the PSC 14 and generates a symbol group into which a CP is inserted. Here, a cyclic prefix indicates some symbols of a rear portion of a plurality of IFFT symbols.

The DAC 16 receives a symbol group into which a CP is inserted from the CP inserter 15, converts the symbol group to analog, and generates one OFDM symbol.

The transmitter 17 amplifies and converts an OFDM symbol that is generated by the DAC 16 to a radio frequency (RF) signal and transmits the RF signal to the channel through at least one transmitting antenna 18.

Figure 2:
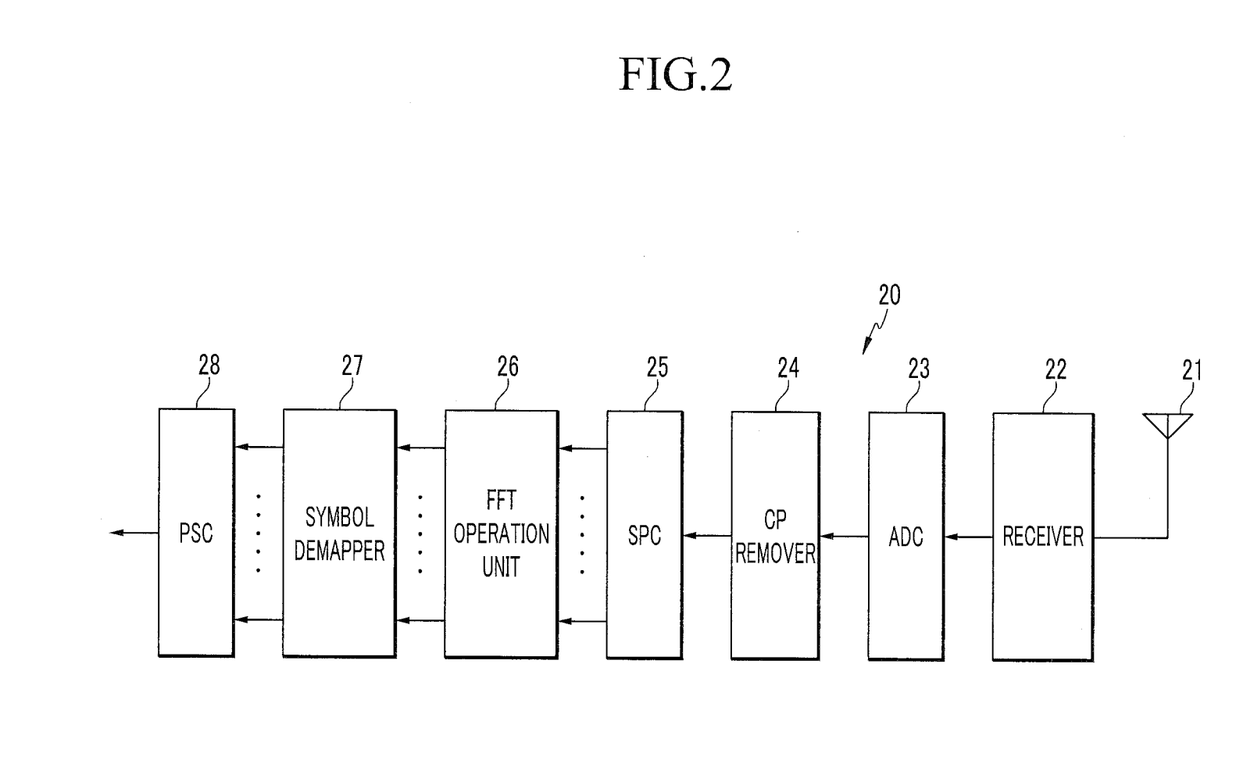
FIG. 2 is a block diagram illustrating a conventional OFDM receiver.

FIG. 2 is a block diagram illustrating a conventional OFDM receiver.

As shown in FIG. 2, the conventional OFDM receiver 20 includes at least one receiving antenna 21, a receiver 22, an analog-to-digital converter (hereinafter, an ADC) 23, a cyclic prefix remover (hereinafter, a CP remover) 24, an SPC 25, a fast Fourier transformer (hereinafter, a FFT operation unit) 26, a symbol demapper 27, and a PSC 28.

The receiver 22 receives an OFDM symbol from a channel through at least one receiving antenna 21.

The ADC 23 converts an OFDM symbol that is received by the receiver 22 to digital and generates a plurality of digital symbols.

The CP remover 24 removes a cyclic prefix from the plurality of digital symbols that the ADC 23 generates.

The SPC 25 receives a plurality of digital symbols in which a CP is removed by the CP remover 24 in series and outputs the plurality of digital symbols in parallel.

The FFT operation unit 26 receives a plurality of symbols that the SPC 25 outputs in parallel, performs fast Fourier transform (FFT), and generates a plurality of fast-Fourier-transformed symbols (FFT symbols).

The symbol demapper 27 generates a plurality of binary data signals by performing digital demodulation such as BPSK, QAM, 16-QAM, and 64-QAM on a plurality of FFT symbols that the FFT operation unit 26 generates.

The PSC 28 converts a plurality of parallel binary data signals that are generated by the symbol demapper 27 to a plurality of serial binary data signals.

However, an OFDM signal generally has a very high average peak-to-average power ratio (PAPR) of about 12 dB in a transmitting terminal, and such a high PAPR causes non-linear distortion in a power amplifier of a transmitter. When not enough backoff is given to electric power, the frequency spectrum of a system is widened and distortion occurs by modulation between frequencies and thus system performance is deteriorated.

A clipping technique and a block coding technique have suggested as methods of lowering a PAPR in an OFDM system. The clipping technique can be easily embodied, but has a drawback that signal quality is deteriorated due to out-of-band radiation and in-band distortion. The block coding technique can limit a PAPR to 3 dB without signal distortion, but has a drawback that as the number of subcarriers increases, a calculation amount exponentially increases and a code rate is greatly deteriorated, and thus spectral efficiency gets worse.

An existing method solves a PAPR problem by compulsorily suppressing a signal of a predetermined size or more in a time domain, and thus a distortion phenomenon of an OFDM signal occurs.

SUMMARY

Embodiments of the present invention provide a data transmission apparatus that can transmit an OFDM symbol by reducing a PAPR and a data receiving apparatus that can obtain desired data by receiving an OFDM symbol in which a PAPR is reduced.

An embodiment of the present invention provides an apparatus for transmitting data. The apparatus includes a first symbol mapper configured to generate a plurality of key symbols by performing symbol mapping on information about an optimum key index that instructs a modified Walsh-Hadamard matrix that causes a minimum peak-to-average power ratio (PAPR), a first modified Walsh-Hadamard transformer configured to generate a plurality of modified Walsh-Hadamard-transformed data symbols by performing modified Walsh-Hadamard transform on a plurality of data symbols according to a modified Walsh-Hadamard matrix that the optimum key index instructs, an inverse Fourier transformer configured to generate a plurality of inverse Fourier-transformed symbols by performing inverse Fourier transform on the plurality of key symbols and the plurality of modified Walsh-Hadamard-transformed data symbols, and a transmitter configured to transmit the plurality of inverse Fourier-transformed symbols to a channel through at least one antenna.

The information about the optimum key index may correspond to an optimum search key index, and the optimum key index may be obtained by a search interval and the optimum search key index.

The apparatus may further include an optimum key index generator configured to generate the optimum key index.

The optimum key index generator may include a key index generator configured to generate a present key index corresponding to a present search key index, a second modified Walsh-Hadamard transformer configured to generate a plurality of modified Walsh-Hadamard-transformed search data symbols by performing modified Walsh-Hadamard transform on the plurality of data symbols according to a modified Walsh-Hadamard matrix that the present key index instructs, a second symbol mapper configured to generate a plurality of search key symbols by performing symbol mapping on the present search key index, an inverse Fourier transformer configured to generate a plurality of inverse Fourier-transformed symbols by performing inverse Fourier transform on the plurality of search key symbols and the plurality of modified Walsh-Hadamard-transformed search data symbols, a measuring unit configured to measure a PAPR of the plurality of inverse Fourier-transformed symbols, and a minimum PAPR detector configured to determine an optimum search key index or an optimum key index corresponding to a minimum PAPR of PAPRs corresponding to a plurality of search key indexes.

The optimum key index generator may further include a key combination vector generator indexes generate a present key combination vector corresponding to the present key index, and a modified Walsh-Hadamard matrix generator indexes generate a modified Walsh-Hadamard matrix according to the present key combination vector.

The key combination vector generator may generate the present key combination vector corresponding to the present key index from a table that defines a relationship between a key index and a key combination vector.

The key combination vector generator may generate the present key combination vector corresponding to the present key index using a key combination vector generation algorithm that receives the present key index as an input.

The second modified Walsh-Hadamard transformer may generate the plurality of modified Walsh-Hadamard-transformed search data symbols by grouping the plurality of data symbols into a plurality of data symbol groups and by performing modified Walsh-Hadamard transform on each data symbol group.

Another embodiment of the present invention provides a method of transmitting data in a data transmission apparatus. The method includes generating a plurality of key symbols by performing symbol mapping on information about an optimum key index that instructs a modified Walsh-Hadamard matrix that causes a minimum PAPR, generating a plurality of modified Walsh-Hadamard-transformed data symbols by performing modified Walsh-Hadamard transform on a plurality of data symbols according to a modified Walsh-Hadamard matrix that the optimum key index instructs, generating a plurality of inverse Fourier-transformed symbols by performing inverse Fourier transform on the plurality of key symbols and the plurality of modified Walsh-Hadamard-transformed data symbols, and transmitting the plurality of inverse Fourier-transformed symbols to a channel through at least one antenna.

The method may further include generating the optimum key index.

Generating the optimum key index may include generating a present key index corresponding to a present search key index, generating a plurality of modified Walsh-Hadamard-transformed search data symbols by performing modified Walsh-Hadamard transform on the plurality of data symbols according to a modified Walsh-Hadamard matrix that the present key index instructs, generating a plurality of search key symbols by performing symbol mapping on the present search key index, generating a plurality of inverse Fourier-transformed symbols by performing inverse Fourier transform on the plurality of search key symbols and the plurality of modified Walsh-Hadamard-transformed search data symbols, measuring a PAPR of the plurality of inverse Fourier-transformed symbols, and determining an optimum search key index or an optimum key index corresponding to a minimum PAPR of PAPRs corresponding to a plurality of search key indexes.

Another embodiment of the present invention provides an apparatus for receiving data. The apparatus includes a receiver configured to receive a plurality of digital symbols from a channel through at least one antenna, a Fourier transformer configured to generate a plurality of Fourier-transformed key symbols and a plurality of Fourier-transformed data symbols by performing Fourier transform on the plurality of digital symbols, an optimum key index generator configured to generate an optimum key index from the plurality of Fourier-transformed key symbols, a modified inverse Walsh-Hadamard transformer configured to generate a plurality of modified inverse Walsh-Hadamard-transformed data symbols by performing modified inverse Walsh-Hadamard transform on the plurality of Fourier-transformed data symbols according to a transposed matrix of a modified Walsh-Hadamard matrix that the optimum key index instructs, and a symbol mapper configured to converts the plurality of modified Walsh-Hadamard-transformed data symbols to a plurality of binary data signals.

The optimum key index generator may generate an optimum search key index from the plurality of Fourier-transformed key symbols and generate the optimum key index using a search interval and the optimum search key index.

The apparatus may further include an optimum key combination vector generator configured to generate an optimum key combination vector corresponding to the optimum key index. A modified Walsh-Hadamard matrix that the optimum key index instructs may be generated by changing a position of a row or a column of an original Walsh-Hadamard matrix according to the optimum key combination vector.

The modified inverse Walsh-Hadamard transformer may generate a plurality of modified inverse Walsh-Hadamard data symbols by grouping the plurality of Fourier-transformed data symbols into a plurality of data symbol groups and by performing modified inverse Walsh-Hadamard transform on each data symbol group.

Another embodiment of the present invention provides a method of receiving data in a data receiving apparatus. The method includes receiving a plurality of digital symbols from a channel through at least one antenna, generating a plurality of Fourier-transformed key symbols and a plurality of Fourier-transformed data symbols by performing Fourier transform on the plurality of digital symbols, generating an optimum key index from the plurality of Fourier-transformed key symbols, generating a plurality of modified inverse Walsh-Hadamard-transformed data symbols by performing modified inverse Walsh-Hadamard transform on the plurality of Fourier-transformed data symbols according to a transposed matrix of a modified Walsh-Hadamard matrix that the optimum key index instructs, and converting the plurality of modified Walsh-Hadamard transformed data symbols to a plurality of binary data signals.

Generating the optimum key index may include generating the optimum search key index from the plurality of Fourier-transformed key symbols, and generating the optimum key index using a search interval and the optimum search key index.

The method may further include generating an optimum key combination vector corresponding to the optimum key index, and generating a modified Walsh-Hadamard matrix that the optimum key index instructs by changing a position of a row or a column of an original Walsh-Hadamard matrix according to the optimum key combination vector.

Generating the plurality of modified inverse Walsh-Hadamard-transformed data symbols may include grouping the plurality of Fourier-transformed data symbols into a plurality of data symbol groups, and generating the plurality of modified inverse Walsh-Hadamard-transformed data symbols by performing modified inverse Walsh-Hadamard transform on each data symbol group.

DETAILED DESCRIPTION OF THE EMBODIMENTS

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

Hereinafter, an OFDM transmitter 100 and an OFDM receiver 200 according to an embodiment of the present invention will be described with reference to FIGS. 3 and 4.

Figure 3:
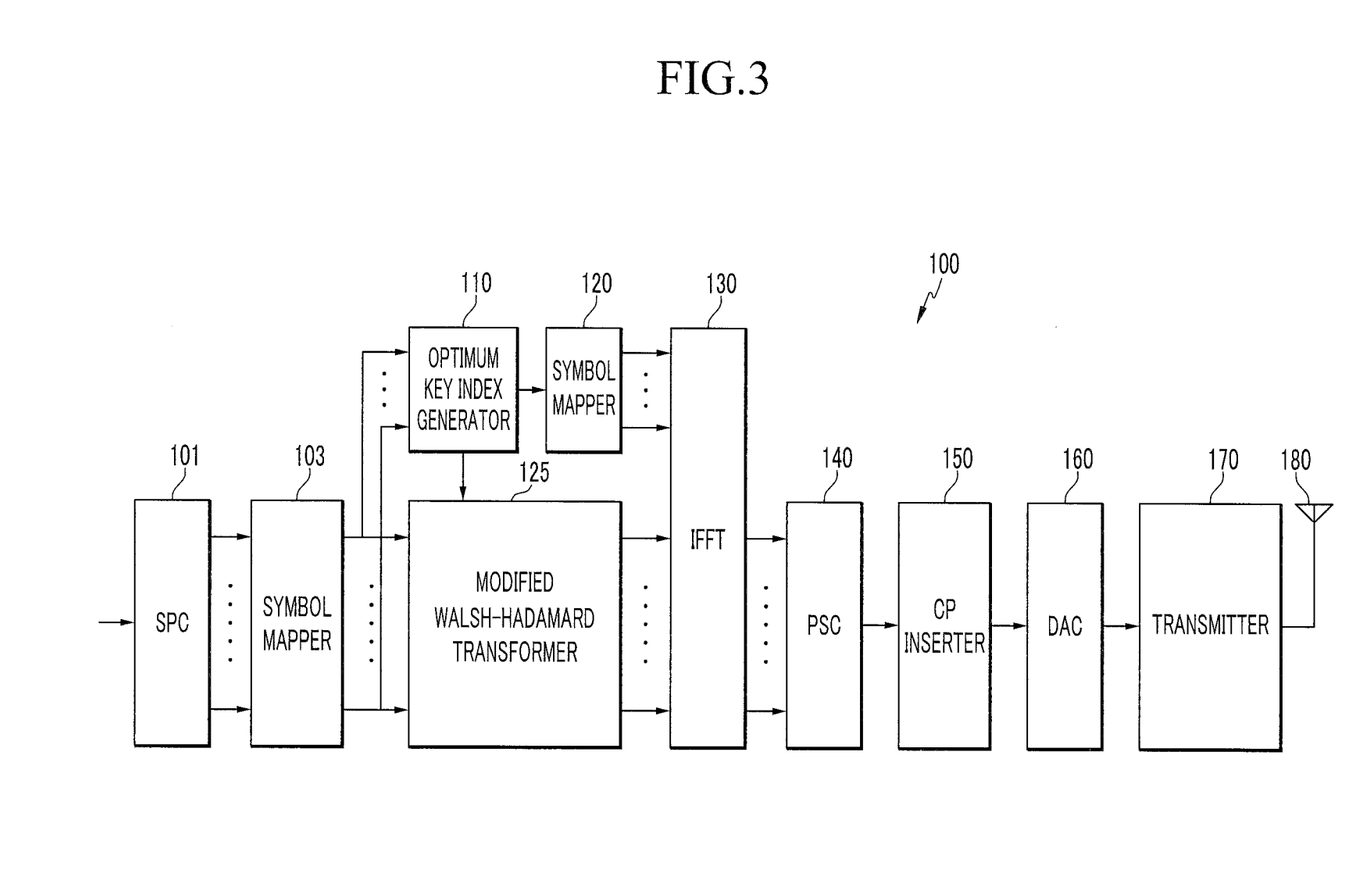
FIG. 3 is a block diagram illustrating an OFDM transmitter according to an embodiment of the present invention.

FIG. 3 is a block diagram illustrating an OFDM transmitter according to an embodiment of the present invention.

As shown in FIG. 3, the OFDM transmitter 100 includes a serial-to-parallel converter (hereinafter, an SPC) 101, a symbol mapper 103, an optimum key index generator 110, a symbol mapper 120, a modified Walsh-Hadamard transformer 125, an inverse fast Fourier transformer (hereinafter, an IFFT operation unit) 130, a parallel-to-serial converter (PSC) 140, a cyclic prefix inserter (hereinafter, a CP inserter) 150, a digital-to-analog converter (hereinafter, a DAC) 160, a transmitter 170, and at least one transmitting antenna 180.

Elements of the OFDM transmitter 100 will be described with reference to FIG. 4.

Figure 4:
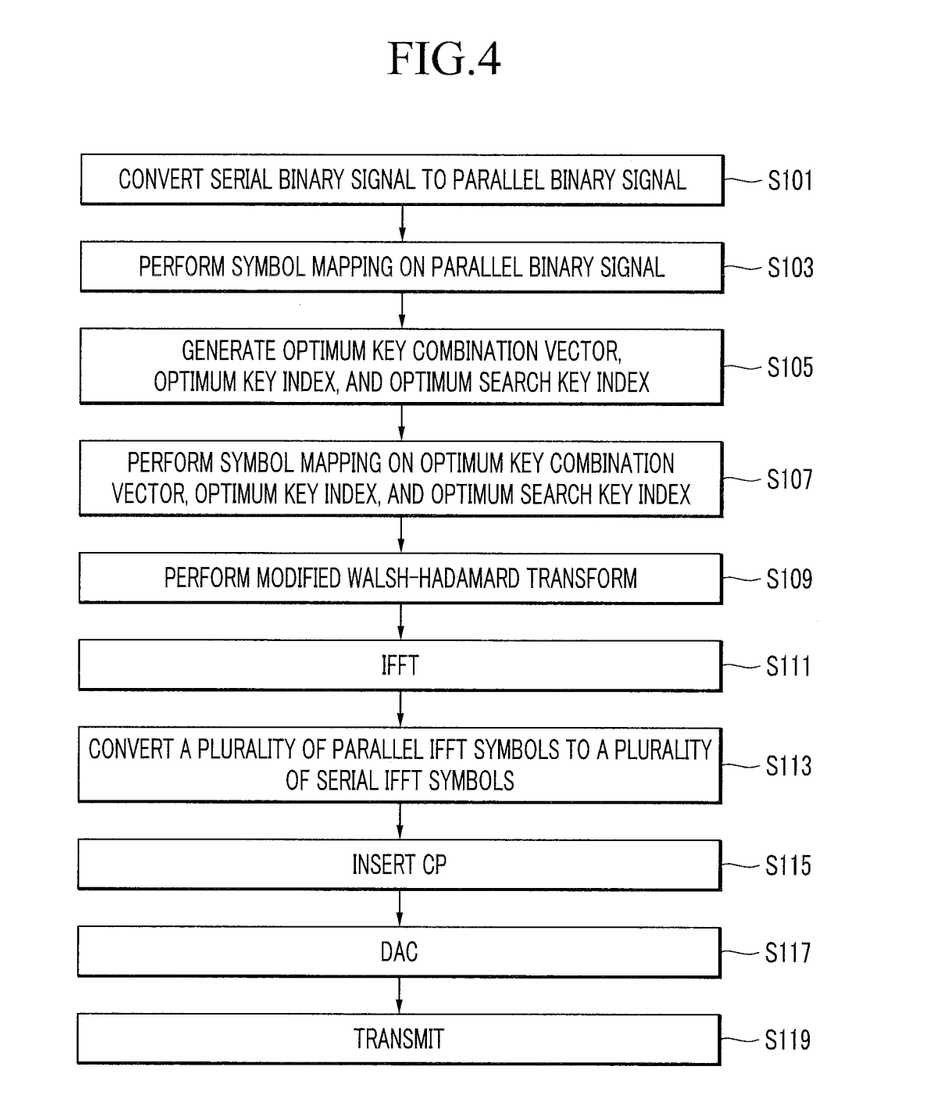
FIG. 4 is a flowchart illustrating a method of transmitting a signal in an OFDM transmitter according to an embodiment of the present invention.

FIG. 4 is a flowchart illustrating a method of transmitting a signal in an OFDM transmitter according to an embodiment of the present invention.

The SPC 101 converts a plurality of serial binary data signals into a plurality of parallel binary data signals (S101).

The symbol mapper 103 generates a plurality of digital-modulated data symbols by performing digital modulation such as BPSK, QAM, 16-QAM, and 64-QAM on a plurality of parallel binary data signals that the SPC 11 outputs in parallel (S103).

The optimum key index generator 110 generates an optimum key combination vector that causes a minimum PAPR, an optimum key index that instructs the optimum key combination vector, and an optimum search key index that instructs the optimum key index (S105). The key combination vector, the key index, and the search key index will be described later.

The symbol mapper 120 generates a plurality of digital-modulated key symbols by performing digital modulation on the optimum key combination vector, the optimum key index, or the search key index (S107). Particularly, because the bit number of the search key index is smaller than that of the optimum key combination vector or the optimum key index, the symbol mapper 120 minimizes an added control data amount by performing digital modulation on the search key index.

The modified Walsh-Hadamard transformer 125 generates a plurality of modified Walsh-Hadamard-transformed data symbols by performing modified Walsh-Hadamard transform on a plurality of digital-modulated data symbols that the symbol mapper 103 outputs according to a modified Walsh-Hadamard matrix that the optimum key index, the optimum search key index, or the optimum key combination vector instructs (S109).

The IFFT operation unit 130 generates a plurality of inverse-fast-fourier-transformed symbols (IFFT symbols) by performing IFFT on the plurality of digital-modulated key symbols that the symbol mapper 120 outputs and a plurality of modified Walsh-Hadamard-transformed data symbols that the modified Walsh-Hadamard transformer 125 outputs (S111). In this case, power may be adjusted so that average power of the plurality of digital-modulated key symbols and average power of the plurality of modified Walsh-Hadamard-transformed data symbols are the same.

The PSC 140 converts the plurality of parallel IFFT symbols that the IFFT operation unit 130 outputs in parallel to a plurality of serial IFFT symbols (S113).

The CP inserter 150 generates a symbol group into which a CP is inserted by adding a signal of a cyclic prefix to a front portion of the plurality of IFFT symbols that the PSC 140 outputs in series (S115). Here, the cyclic prefix may indicate some symbols of a rear portion of the plurality of IFFT symbols.

The DAC 160 receives a symbol group into which a CP is inserted from the CP inserter 150, converts the symbol group to analog, and generates one OFDM symbol (S117).

The transmitter 170 amplifies and converts the OFDM symbol that is generated by the DAC 160 to an RF signal and transmits the RF signal to a channel through at least one transmitting antenna 180 (S119).

Hereinafter, the optimum key index generator 110 according to an embodiment of the present invention will be described with reference to FIG. 5.

Figure 5:
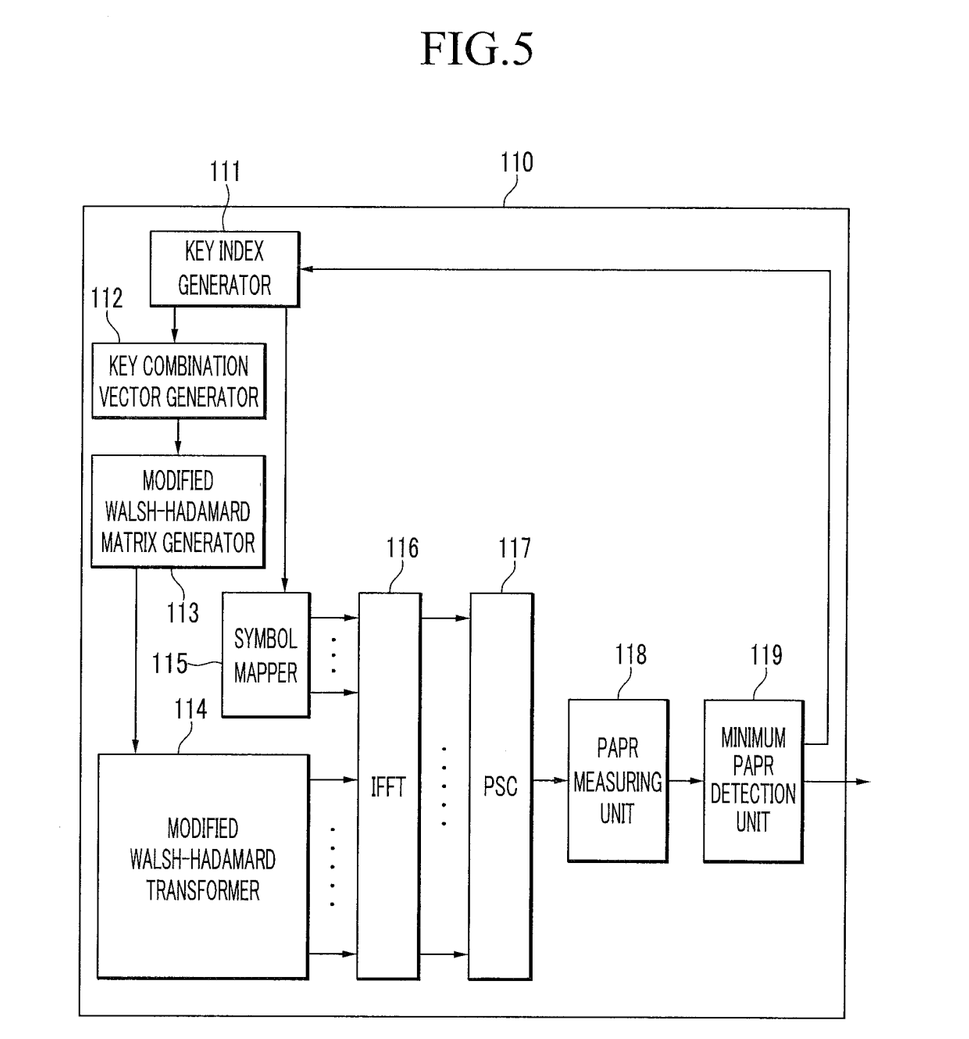
FIG. 5 is a block diagram illustrating an optimum key index generator according to an embodiment of the present invention.

FIG. 5 is a block diagram illustrating an optimum key index generator according to an embodiment of the present invention.

As shown in FIG. 5, the optimum key index generator 110 according to an embodiment of the present invention includes a key index generator 111, a key combination vector generator 112, a modified Walsh-Hadamard matrix generator 113, a modified Walsh-Hadamard transformer 114, a symbol mapper 115, an inverse fast Fourier transformer (IFFT operation unit) 116, a parallel-to-serial converter (PSC) 117, a PAPR measuring unit 118, and a minimum PAPR detection unit 119.

Constituent elements of the optimum key index generator 110 will be described with reference to FIG. 6.

Figure 6:
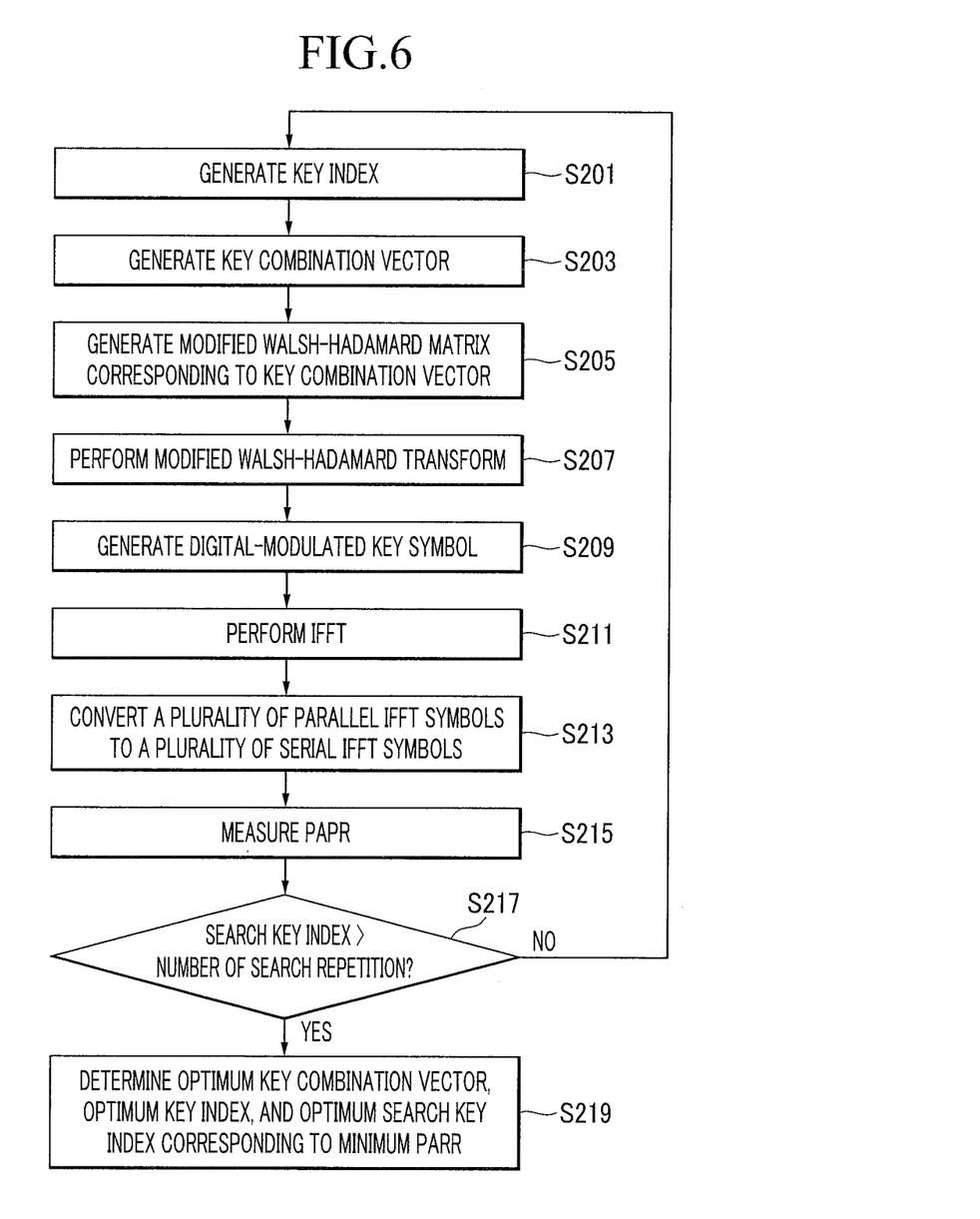
FIG. 6 is a flowchart illustrating a method of generating an optimum key index according to an embodiment of the present invention.

FIG. 6 is a flowchart illustrating a method of generating an optimum key index according to an embodiment of the present invention.

The key index generator 111 generates a key index while changing a search key index (S201). The key index generator 111 generates the key index according to Equation 1.

(key index)=(previous key index)+fix((entire number of key indexes)/(number of search repetitions))*((search key index)−1)   (Equation 1)

In Equation 1, fix(x) is a function that returns a largest integer smaller than x. fix((entire number of key indexes)/(number of search repetitions)) represents a search interval.

In an embodiment of the present invention, the search key index increases by 1 from 1 until arriving at the search repetition number.

A Walsh-Hadamard matrix is represented by Equation 2.

$$H(2^0) = [1],$$ (Equation 2)

$$H(2^1) = \begin{bmatrix} 1 & 1 \\ 1 & -1 \end{bmatrix},$$

$$H(2^2) = \begin{bmatrix} 1 & 1 & 1 & 1 \\ 1 & -1 & 1 & -1 \\ 1 & 1 & -1 & -1 \\ 1 & -1 & -1 & 1 \end{bmatrix},$$

$$H(2^k) = \begin{bmatrix} H(2^{k-1}) & H(2^{k-1}) \\ H(2^{k-1}) & -H(2^{k-1}) \end{bmatrix}$$

In Equation 2, K is an integer, and is not negative.

When a size of a Walsh-Hadamard matrix corresponds to M×M, M=$2^k$.

A modified Walsh-Hadamard matrix is generated by changing a position of rows or columns of a Walsh-Hadamard matrix.

When a Walsh-Hadamard matrix that is modified by changing a position of rows that are related to a 4×4 Walsh-Hadamard matrix is represented by $RMH(4)_{(k1, k2, k3, k4)}$, and a Walsh-Hadamard matrix that is modified by changing a position of columns is represented by $CMH(4)_{(k1, k2, k3, k4)}$, the following relationship is obtained:

1) 1st, 2nd, 3rd, and 4th rows of $RMH(4)_{(k1, k2, k3, k4)}$ are the same as the k1st, k2nd, k3rd, and k4th rows of the Walsh-Hadamard matrix.

2) $RMH(4)_{(k1, k2, k3, k4)}$ represents an original Walsh-Hadamard matrix.

3) 1st, 2nd, 3rd, and 4th columns of $CMH(4)_{(k1, k2, k3, k4)}$ are the same as the k1st, k2nd, k3rd, and k4th columns of the Walsh-Hadamard matrix.

4) $CMH(4)_{(k1, k2, k3, k4)}$ represents an original Walsh-Hadamard matrix.

5) $RMH(4)_{(k1, k2, k3, k4)} = [CMH(4, k1,k2,k3,k4)]^T$

Due to a relationship of $RMH(4)_{(k1,k2,k3,k4)} = [CMH(4)_{(k1,k2,k3,k4)}]^T$, in order to generate a modified Walsh-Hadamard matrix, only one of a row position change and a column position change is considered. That is, in order to instruct the modified Walsh-Hadamard matrix, vectors k1, k2, k3, and k4 may be used. The vectors k1, k2, k3, and k4 are referred to as key combination vectors.

Further, the entire number of generable modified Walsh-Hadamard matrixes is the same as the entire number of key combination vectors that can be generated with elements 1, 2, 3, and 4. That is, the entire number of modified Walsh-Hadamard matrixes that can be generated with a 4×4 Walsh-hadamard matrix is 4!=24. The key index instructs a modified Walsh-Hadamard matrix or a key combination vector, and thus the entire number of key indexes is also 4!. The entire number of key indexes for an M×M Walsh-Hadamard matrix is M!.

The key combination vector generator 112 generates a key combination vector corresponding to a key index that the key index generator 111 generates (S203). The key combination vector generator 112 generates the key combination vector according to Table 1.

TABLE 1

| Key index | Key combination vector | | | |
|---|---|---|---|---|
| 1 | 1 | 2 | 3 | 4 |
| 2 | 1 | 2 | 4 | 3 |
| 3 | 1 | 3 | 2 | 4 |
| 4 | 1 | 3 | 4 | 2 |
| 5 | 1 | 4 | 2 | 3 |
| 6 | 1 | 4 | 3 | 2 |
| 7 | 2 | 1 | 3 | 4 |
| 8 | 2 | 1 | 4 | 3 |
| 9 | 2 | 3 | 1 | 4 |
| 10 | 2 | 3 | 4 | 1 |
| 11 | 2 | 4 | 1 | 3 |
| 12 | 2 | 4 | 3 | 1 |
| 13 | 3 | 1 | 2 | 4 |
| 14 | 3 | 1 | 4 | 2 |
| 15 | 3 | 2 | 1 | 4 |
| 16 | 3 | 2 | 4 | 1 |
| 17 | 3 | 4 | 1 | 2 |
| 18 | 3 | 4 | 2 | 1 |
| 19 | 4 | 1 | 2 | 3 |
| 20 | 4 | 1 | 3 | 2 |
| 21 | 4 | 2 | 1 | 3 |
| 22 | 4 | 2 | 3 | 1 |
| 23 | 4 | 3 | 1 | 2 |
| 24 | 4 | 3 | 2 | 1 |

Figure 7:
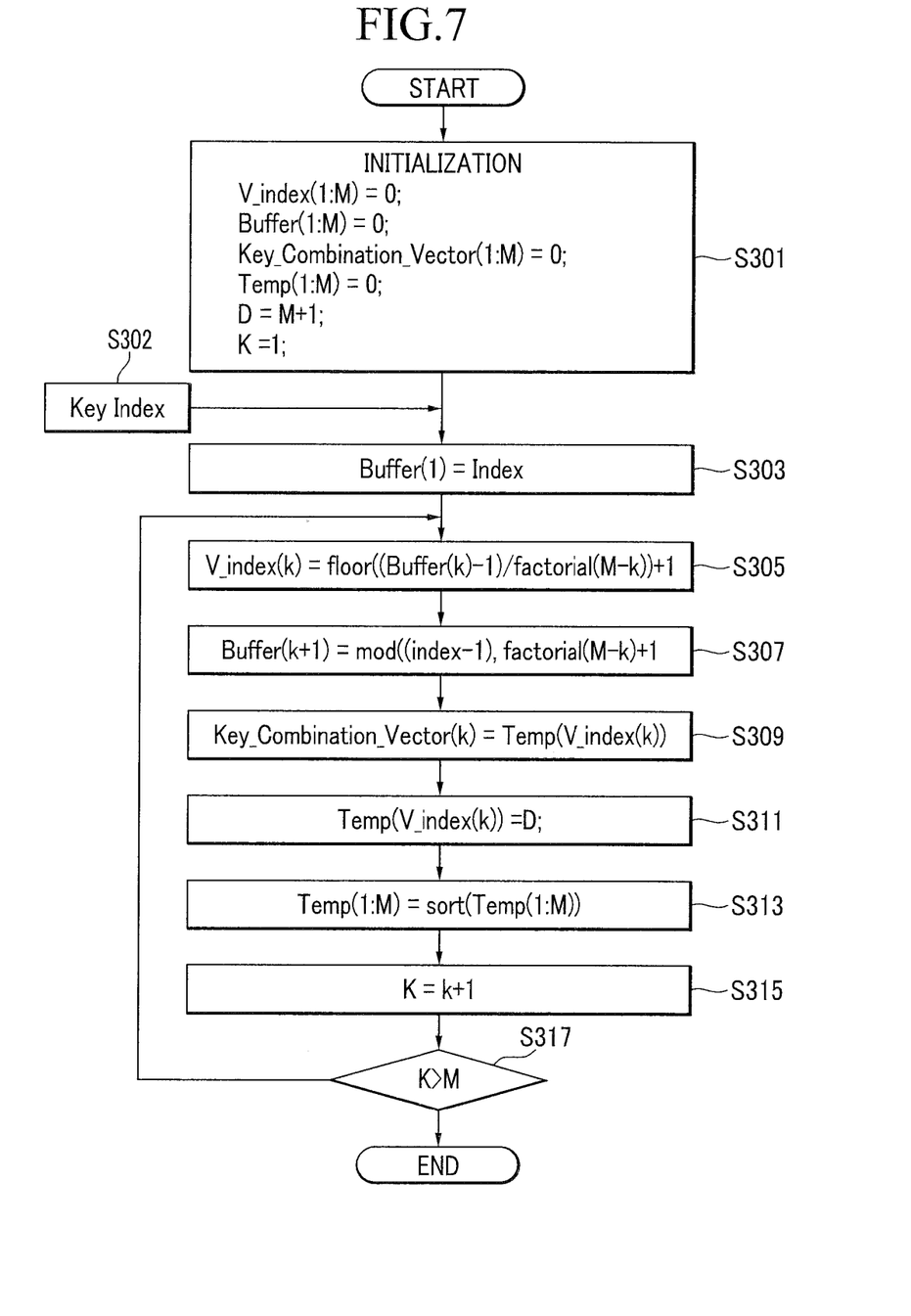
FIG. 7 is a flowchart illustrating an algorithm for generating a key combination vector according to an embodiment of the present invention.

In order to generate a key combination vector corresponding to Table 1, the key combination vector generator 112 uses the algorithm of FIG. 7.

FIG. 7 is a flowchart illustrating algorithm for generating a key combination vector according to an embodiment of the present invention.

First, the key combination vector generator 112 performs initialization of a variable (S301). A variable V-index (1:M), a buffer (1:M), a key_combination_Vector (1:M), and a temp (1:M) are initialized to 0, a variable D is initialized to M+1, and a variable k is initialized to 1.

The key combination vector generator 112 receives a key index (S302).

The key combination vector generator 112 stores a value of the key index at the buffer (1) (S303).

Thereafter, the key combination vector generator 112 stores "floor((Buffer(k)−1/factorial(M−k))+1" at a variable V_index k (S305). The floor(x) returns an integer smaller than or equal to x.

The key combination vector generator 112 stores "mod ((index−1), factorial (M−k))+1" at a variable (Buffer(k+1)) (S307). Mod(A, B) indicates A-floor (A/B)×C.

The key combination vector generator 112 stores Temp (V_index(k)) at a variable Key_Combination_Vector(k) (S309).

The key combination vector generator 112 stores D at a variable Temp(V_index(k)) (S311).

The key combination vector generator 112 stores sort Temp(1:M) at a variable Temp(1:M) (S313). Sort(A) indicates a sequential arrangement from the minimum number to the maximum number among elements of A.

The key combination vector generator 112 increases the variable k by 1 (S315).

The key combination vector generator 112 determines whether the variable k is larger than M (S317), and if a variable k is equal to or smaller than M, the process returns to step S305.

If a variable k is larger than M, the key combination vector generator 112 outputs a variable Key_combination_Vector (1:M) to the key combination vector.

Hereinafter, FIG. 6 will be described again.

The modified Walsh-Hadamard matrix generator 113 generates a modified Walsh-Hadamard matrix according to a key combination vector that the key combination vector generator 112 generates (S205). When the key combination vector corresponds to vectors k1, k2, k3, and k4, the modified Walsh-Hadamard matrix generator 113 converts k1st, k2nd, k3rd, and k4th rows or columns of an original Walsh-Hadamard matrix to 1st, 2nd, 3rd, and 4th rows or columns of a modified Walsh-Hadamard matrix and generates a modified Walsh-Hadamard matrix.

When a 4×4 original Walsh-Hadamard matrix is represented by Equation 3, an example of a 4×4 modified Walsh-Hadamard matrix is represented in Equations 4 to 6.

$$RMH(4)_{(1,2,3,4)} = \begin{pmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{pmatrix} \quad \text{(Equation 3)}$$

$$RMH(4)_{(2,3,4,1)} = \begin{pmatrix} M_{21} & M_{22} & M_{23} & M_{24} \\ M_{31} & M_{32} & M_{33} & M_{34} \\ M_{41} & M_{42} & M_{43} & M_{44} \\ M_{11} & M_{12} & M_{13} & M_{14} \end{pmatrix} \quad \text{(Equation 4)}$$

$$RMH(4)_{(3,4,1,2)} = \begin{pmatrix} M_{31} & M_{32} & M_{33} & M_{34} \\ M_{41} & M_{42} & M_{43} & M_{44} \\ M_{11} & M_{12} & M_{13} & M_{14} \\ M_{21} & M_{22} & M_{23} & M_{24} \end{pmatrix} \quad \text{(Equation 5)}$$

$$RMH(4)_{(3,2,4,1)} = \begin{pmatrix} M_{31} & M_{32} & M_{33} & M_{34} \\ M_{21} & M_{22} & M_{23} & M_{24} \\ M_{41} & M_{42} & M_{43} & M_{44} \\ M_{11} & M_{12} & M_{13} & M_{14} \end{pmatrix} \quad \text{(Equation 6)}$$

An M value does not exceed ((number of subcarriers of OFDM)−(number of subcarriers that are allocated to a search key index)) and is determined so that ((number of subcarriers of OFDM)−(number of subcarriers that are allocated to a search key index)/M) is an integer.

The number of subcarriers that are allocated to the search key index is determined using the number of search repetitions. For example, when the number of search repetitions is 1024, a binary code of the number of search repetitions is 10000000000b. When a modulation method for transmission of a search key index is BPSK, at least 10 subcarriers are necessary for transmission of a search key index. When a modulation method for transmission of a search key index is QPSK, at least 5 subcarriers are necessary for transmission of a search key index. In this case, the number of subcarriers that are used for transmission of an actual search key index may be determined by ((entire number of subcarriers of OFDMA)−M*floor(number of subcarriers of OFDMA/M)). When the number of subcarriers necessary for transmission of a search key index is larger than ((entire number of subcarriers of OFDMA)−M*floor(number of subcarriers of OFDMA/M)), M subcarriers may be additionally allocated.

That is, it is assumed that the entire number of subcarriers of an OFDM is 500, M is 8, and at least 5 subcarriers are necessary for transmission of a search key index. In this case, if the number of subcarriers that are used for transmission of a search key index is determined by ((entire number of subcarriers of OFDMA)−M*floor(number of subcarriers of OFDMA/M)), only 4 subcarriers are allocated to the search key index, and so enough subcarriers are not allocated for transmission of a search key index. Therefore, M(=8) subcarriers are additionally allocated for transmission of a search key index such that 488 of 500 subcarriers are used as a subcarrier for transmission of input data, and 12 subcarriers are used for transmission of a search key index.

The modified Walsh-Hadamard transformer 114 generates a plurality of modified Walsh-Hadamard-transformed data symbols by performing modified Walsh-Hadamard transform on a plurality of digital-modulated data symbols that the symbol mapper 103 outputs according to a modified Walsh-Hadamard matrix that the modified Walsh-Hadamard matrix generator 113 generates (S207). The modified Walsh-Hadamard transformer 114 receives digital-modulated data symbols corresponding to ((entire number of subcarriers of OFDMA)-(number of subcarriers that are used for transmission of a search key index)) from the symbol mapper 103. The modified Walsh-Hadamard transformer 114 groups N digital-modulated data symbols into N/M digital-modulated data symbol groups. When the N digital-modulated data symbols are represented by Equation 7, M digital-modulated data symbol groups are represented by Equation 8.

$$InD = (InD_1 InD_2 InD_3 \ldots InD_N) \quad \text{(Equation 7)}$$

$$GInD = (GInD_1\ GInD_2 GInD_3 \ldots GInD_{N/M}) \quad \text{(Equation 8)}$$

where, $GInD_k=(InD_{(k-1)\times M+1} \ InD_{(k-1)\times M+2} \ \cdots \ InD_{(k-1)\times M+M})$ In Equation 7, $InD_i$ represents an i-th digital-modulated data symbol, and in Equation 8, $GInD_k$ represents a k-th digital-modulated data symbol group.

The modified Walsh-Hadamard transform may be performed according to Equation 9.

$$W_k = \frac{1}{\sqrt{M}} \times GInX_k \times (\text{Modified Walsh} - \text{Hadamard matrix}) \quad \text{(Equation 9)}$$

In Equation 9, $W_k$ represents a k-th modified Walsh-Hadamard-transformed data symbol group.

When the modified Walsh-Hadamard matrix corresponds to Equation 4, a k-th modified Walsh-Hadamard-transformed symbol group is represented by Equation 10.

$$W_k = \frac{1}{\sqrt{M}} \times GInD_k \times \begin{pmatrix} M_{21} & M_{22} & M_{23} & M_{24} \\ M_{31} & M_{32} & M_{33} & M_{34} \\ M_{41} & M_{42} & M_{43} & M_{44} \\ M_{11} & M_{12} & M_{13} & M_{14} \end{pmatrix} \quad \text{(Equation 10)}$$

For example, when a k-th digital-modulated data symbol group is 1+j, 2+j, 1−j, and 2−j, and the modified Walsh-Hadamard matrix corresponds to Equation 6, the k-th modified Walsh-Hadamard-transformed symbol group $W_k$ is represented by Equation 11.

$$\begin{aligned} W_k &= \frac{1}{\sqrt{M}} \times GInD_k \times RMH(4)_{(3,2,4,1)} \quad \text{(Equation 11)} \\ &= \frac{1}{\sqrt{4}} \times (1+j \ 2+j \ 1-j \ 2-j) \times \begin{pmatrix} 1 & -1 & 1 & -1 \\ 1 & 1 & -1 & -1 \\ 1 & -1 & -1 & 1 \\ 1 & 1 & 1 & 1 \end{pmatrix} \\ &= (3 \ 1 \ 0 \ -2j) \end{aligned}$$

The symbol mapper 115 performs digital modulation on an optimum key combination vector, an optimum key index, or an optimum search key index and generates a plurality of digital-modulated key symbols (S209). Particularly, because the bit number of a search key index is smaller than an optimum key combination vector or an optimum key index, the symbol mapper 115 performs digital modulation on the search key index, thereby minimizing an added control data amount.

The IFFT operation unit 116 performs IFFT on a plurality of digital-modulated key symbols that the symbol mapper 115 outputs and a plurality of modified Walsh-Hadamard-transformed data symbols that the modified Walsh-Hadamard transformer 114 outputs, and generates a plurality of IFFT symbols (S211).

The PSC 117 converts a plurality of parallel IFFT symbols that are output by the IFFT operation unit 130 to a plurality of serial IFFT symbols (S213).

The PAPR measuring unit 118 measures a PAPR of a signal that is formed with a plurality of IFFT symbols that the PSC 117 outputs in series (S215).

If the search key index is equal to or smaller than the number of search repetitions (S217), the optimum key index generator 110 increases a value of the search key index by 1, and the process returns to step S201 and an optimum key index is again generated.

If the search key index is larger than the number of search repetitions (S217), the minimum PAPR detection unit 119 compares a plurality of PAPR values corresponding to each of a plurality of search key indexes, finds a minimum value, determines an optimum key combination vector, an optimum key index, and an optimum search key index corresponding to the minimum PAPR, and provides at least one of them to the modified Walsh-Hadamard transformer 125 (S219).

Hereinafter, the OFDM receiver 200 according to an embodiment of the present invention will be described with reference to FIG. 8.

Figure 8:
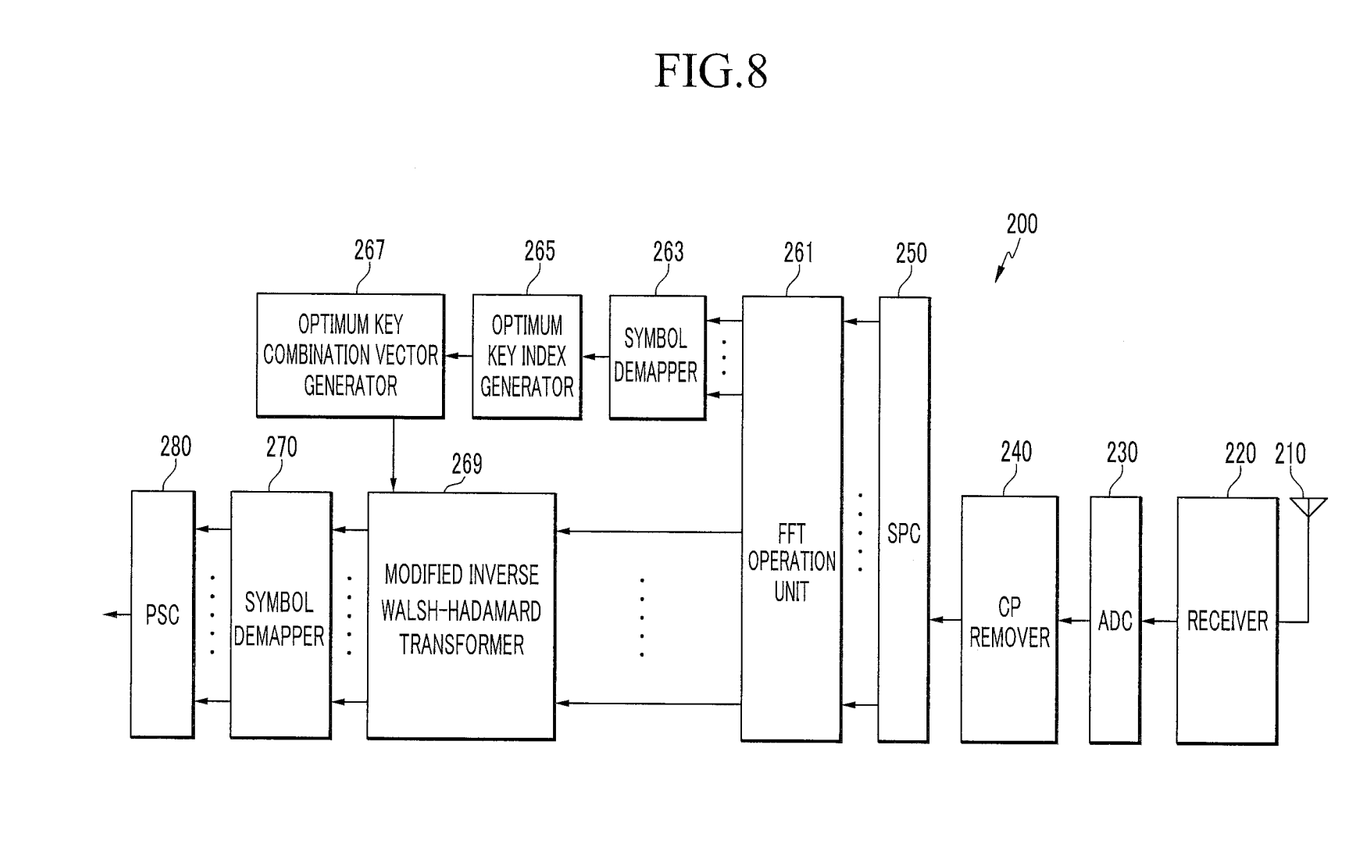
FIG. 8 is a block diagram illustrating an OFDM receiver according to an embodiment of the present invention.

FIG. 8 is a block diagram illustrating an OFDM receiver according to an embodiment of the present invention.

As shown in FIG. 8, the OFDM receiver 200 includes at least one receiving antenna 210, a receiver 220, an analog-to-digital converter (hereinafter, an ADC) 230, a cyclic prefix remover (hereinafter, a CP remover) 240, an SPC 250, a fast Fourier transformer (hereinafter, an FFT operation unit) 261, a symbol demapper 263, an optimum key index generator 265, an optimum key combination vector generator 267, a modified inverse Walsh-Hadamard transformer 269, a symbol demapper 270, and a PSC 280.

Constituent elements of the OFDM receiver 200 will be described with reference to FIG. 9.

Figure 9:
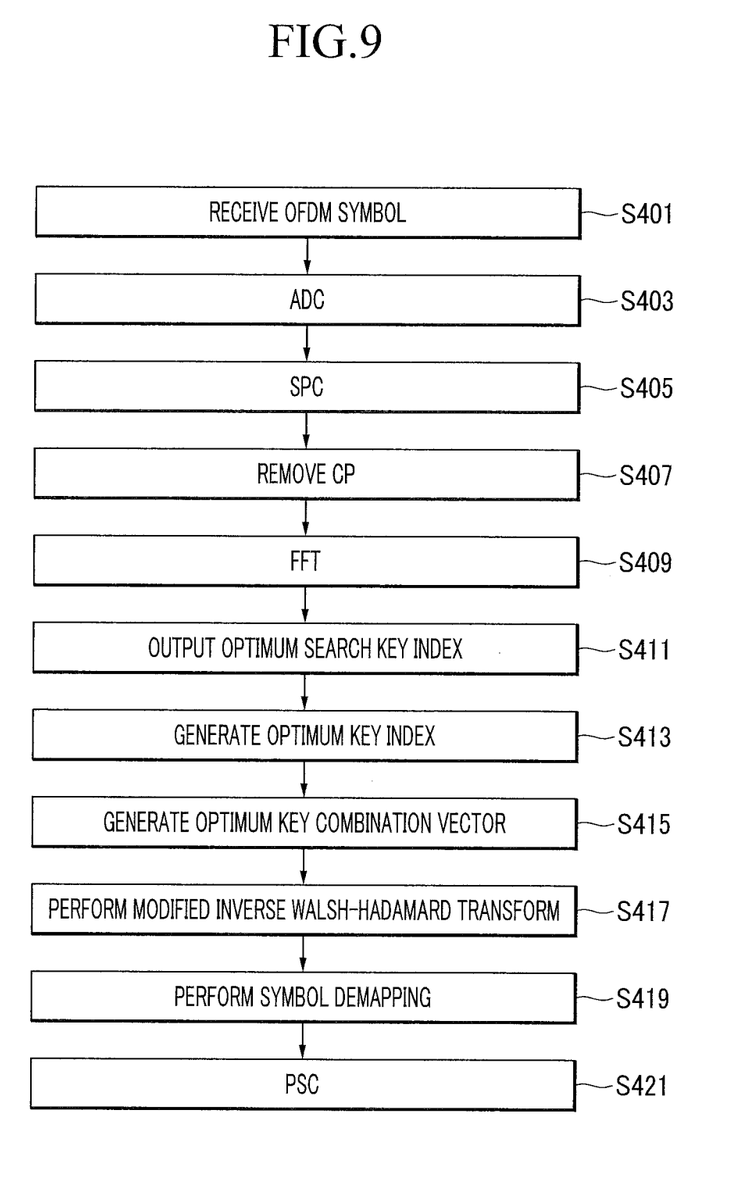
FIG. 9 is a flowchart illustrating a method of receiving a signal in an OFDM receiver according to an embodiment of the present invention.

FIG. 9 is a flowchart illustrating a method of receiving a signal in an OFDM receiver according to an embodiment of the present invention.

The receiver 220 receives an OFDM symbol from a channel through at least one receiving antenna 210 (S401).

The ADC 230 converts an OFDM symbol that is received by the receiver 220 to digital and generates a plurality of digital symbols (S403).

The CP remover 240 removes a cyclic prefix from a plurality of digital symbols that are generated by the ADC 230 (S405).

The SPC 250 converts a plurality of serial digital symbols in which a CP is removed by the CP remover 240 to a plurality of parallel digital symbols (S407).

The FFT operation unit 261 receives a plurality of symbols that the SPC 250 outputs in parallel, performs fast Fourier transform (FFT), and generates a plurality of fast-Fourier-transformed symbols (FFT symbols)) (S409).

The symbol demapper 263 outputs an optimum search key index by performing digital demodulation such as BPSK, QAM, 16-QAM, and 64-QAM on a plurality of FFT symbols corresponding to a subcarrier that is allocated to a search key index among a plurality of FFT symbols that the FFT operation unit 261 outputs (S411).

The optimum key index generator 265 generates an optimum key index corresponding to an optimum search key index that the symbol demapper 263 outputs (S413). The optimum key index generator 265 generates an optimum key index corresponding to an optimum search key index with the same method as that in which the key index generator 111 of the OFDM transmitter 100 generates a key index.

The optimum key combination vector generator 267 generates an optimum key combination vector corresponding to an optimum key index that the optimum key index generator 265 outputs (S415). The optimum key combination vector generator 267 generates an optimum key combination vector corresponding to an optimum key index with the same method as that in which the key combination vector generator 112 of the OFDM transmitter 100 generates a key combination vector.

The modified inverse Walsh-Hadamard transformer 269 performs modified Walsh-Hadamard transform on N FFT symbols corresponding to subcarriers that are allocated to input data among a plurality of FFT symbols that are output by the FFT operation unit 261 according to a transposed matrix of a modified Walsh-Hadamard matrix corresponding to an optimum search key index, an optimum key index, or an optimum key combination vector and generates N modified Walsh-Hadamard-transformed data symbols (S417). The modified inverse Walsh-Hadamard transformer 269 groups N FFT symbols into N/M FFT symbol groups. When N FFT symbols are represented by Equation 12, M FFT symbol groups are represented by Equation 13.

$$InX = (InX_1 InX_2 InX_3 \ldots InX_N) \quad \text{(Equation 12)}$$

$$GInX = (GInX_1 GInX_2 GInX_3 \ldots GInX_{N/M}) \quad \text{(Equation 13)}$$

where, $GInX_k = (InX_{(k-1) \times M+1} \quad InX_{(k-1) \times M+2} \quad \ldots \quad InX_{(k-1) \times M+M})$ In Equation 12, $InX_i$ represents an i-th FFT symbol, and $GInX_k$ represents a k-th FFT symbol group.

The modified inverse Walsh-Hadamard transformer 269 performs modified inverse Walsh-Hadamard transform according to Equation 14.

$$GY_k = \frac{1}{\sqrt{M}} \times GInX_k \times (\text{Modified Walsh} - \text{Hadamard matrix})^T \quad \text{(Equation 14)}$$

In Equation 14, $GY_k$ corresponds to a k-th modified Walsh-Hadamard-transformed data symbol group.

When an optimum key combination vector corresponds to (2, 3, 4, 1), a modified Walsh-Hadamard matrix corresponding to an optimum key combination vector corresponds to Equation 4. In this case, a k-th modified Walsh-Hadamard-transformed data symbol group is represented by Equation 15.

$$GY_k = \frac{1}{\sqrt{M}} \times GInX_k \times \begin{pmatrix} M_{21} & M_{22} & M_{23} & M_{24} \\ M_{31} & M_{32} & M_{33} & M_{34} \\ M_{41} & M_{42} & M_{43} & M_{44} \\ M_{11} & M_{12} & M_{13} & M_{14} \end{pmatrix}^T \quad \text{(Equation 15)}$$

For example, when a k-th FFT symbol group is $(3, 1, 0, -2j)$ and a modified Walsh-Hadamard matrix corresponding to an optimum key combination vector corresponds to Equation 6, a k-th modified Walsh-Hadamard-transformed data symbol group is represented by Equation 16.

$$GY_k = \frac{1}{\sqrt{M}} \times GInX_k \times [RMH(4)_{(3,2,4,1)}]^T \quad \text{(Equation 16)}$$

$$= \frac{1}{\sqrt{4}} \times (3 \quad 1 \quad 0 \quad -2j) \times \begin{pmatrix} 1 & -1 & 1 & -1 \\ 1 & 1 & -1 & -1 \\ 1 & -1 & -1 & 1 \\ 1 & 1 & 1 & 1 \end{pmatrix}^T$$

$$= (1+j \quad 2+j \quad 1-j \quad 2-j)$$

The symbol demapper 270 performs digital demodulation such as BPSK, QAM, 16-QAM, and 64-QAM on N modified Walsh-Hadamard-transformed data symbols that the modified inverse Walsh-Hadamard transformer 269 outputs and generates a plurality of binary data signals (S419).

The PSC 280 converts a plurality of parallel binary data signals that are generated by the symbol demapper 270 to a plurality of serial binary data signals (S421).

In this way, according to an embodiment of the present invention, a PAPR of an OPDM signal can be greatly reduced while sustaining the same bit error rate (BER) performance as that of an existing OFDM system using a modified Walsh-Hadamard transform.

Further, a PAPR of an OFDM signal of an existing OFDM signal transmission apparatus was a maximum of about 12 dB, but as a simulation result according to an embodiment of the present invention, a PAPR can be reduced by a maximum of about 4 dB to a maximum of about 8 dB. This means that an output of a transmitter can be reduced by about 40%, compared with an existing output.

Further, a problem due to a high PAPR, i.e., distortion generation due to modulation between frequencies and non-linear distortion that is caused by a power amplifier, can be improved.

An embodiment of the present invention may not only be embodied through an apparatus and method but may also be embodied through a program that executes a function corresponding to a configuration of the embodiment of the present invention or through a recording medium on which the program is recorded, and can be easily embodied from a description of the foregoing embodiment.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for transmitting data, the apparatus comprising:
    a first symbol mapper configured to generate a plurality of key symbols by performing symbol mapping on information about an optimum key index that instructs a modified Walsh-Hadamard matrix that causes a minimum peak-to-average power ratio (PAPR);
    a first modified Walsh-Hadamard transformer configured to generate a plurality of modified Walsh-Hadamard-transformed data symbols by performing modified Walsh-Hadamard transform on a plurality of data symbols according to a modified Walsh-Hadamard matrix that the optimum key index instructs;
    an inverse Fourier transformer configured to generate a plurality of inverse Fourier-transformed symbols by performing inverse Fourier transform on the plurality of key symbols and the plurality of modified Walsh-Hadamard-transformed data symbols; and
    a transmitter configured to transmit the plurality of inverse Fourier-transformed symbols to a channel through at least one antenna.

2. The apparatus of claim 1, wherein the information about the optimum key index corresponds to an optimum search key index, and
    the optimum key index is obtained by a search interval and the optimum search key index.

3. The apparatus of claim 2, further comprising an optimum key index generator configured to generate the optimum key index.

4. The apparatus of claim 3, wherein the optimum key index generator comprises:
    a key index generator configured to generate a present key index corresponding to a present search key index;

a second modified Walsh-Hadamard transformer configured to generate a plurality of modified Walsh-Hadamard-transformed search data symbols by performing modified Walsh-Hadamard transform on the plurality of data symbols according to a modified Walsh-Hadamard matrix that the present key index instructs;

a second symbol mapper configured to generate a plurality of search key symbols by performing symbol mapping on the present search key index;

an inverse Fourier transformer configured to generate a plurality of inverse Fourier-transformed symbols by performing inverse Fourier transform on the plurality of search key symbols and the plurality of modified Walsh-Hadamard-transformed search data symbols;

a measuring unit configured to measure a PAPR of the plurality of inverse Fourier-transformed symbols; and a minimum PAPR detector configured to determine an optimum search key index or an optimum key index corresponding to a minimum PAPR of PAPRs corresponding to a plurality of search key indexes.

5. The apparatus of claim 4, wherein the optimum key index generator further comprises:

a key combination vector generator configured to generate a present key combination vector corresponding to the present key index; and a modified Walsh-Hadamard matrix generator configured to generate a modified Walsh-Hadamard matrix according to the present key combination vector.

6. The apparatus of claim 5, wherein the key combination vector generator generates the present key combination vector corresponding to the present key index from a table that defines a relationship between a key index and a key combination vector.

7. The apparatus of claim 6, wherein the key combination vector generator generates the present key combination vector corresponding to the present key index using a key combination vector generation algorithm that receives the present key index as an input.

8. The apparatus of claim 4, wherein the second modified Walsh-Hadamard transformer generates the plurality of modified Walsh-Hadamard-transformed search data symbols by grouping the plurality of data symbols into a plurality of data symbol groups and by performing modified Walsh-Hadamard transform on each data symbol group.

9. A method of transmitting data in a data transmission apparatus, the method comprising:

generating a plurality of key symbols by performing symbol mapping on information about an optimum key index that instructs a modified Walsh-Hadamard matrix that causes a minimum PAPR;

generating a plurality of modified Walsh-Hadamard-transformed data symbols by performing modified Walsh-Hadamard transform on a plurality of data symbols according to a modified Walsh-Hadamard matrix that the optimum key index instructs;

generating a plurality of inverse Fourier-transformed symbols by performing inverse Fourier transform on the plurality of key symbols and the plurality of modified Walsh-Hadamard-transformed data symbols; and transmitting the plurality of inverse Fourier-transformed symbols to a channel through at least one antenna.

10. The method of claim 9, wherein the information about the optimum key index corresponds to an optimum search key index, and the optimum key index is obtained by a search interval and the optimum search key index.

11. The method of claim 10, further comprising generating the optimum key index.

12. The method of claim 11, wherein generating the optimum key index comprises:

generating a present key index corresponding to a present search key index;

generating a plurality of modified Walsh-Hadamard-transformed search data symbols by performing modified Walsh-Hadamard transform on the plurality of data symbols according to a modified Walsh-Hadamard matrix that the present key index instructs;

generating a plurality of search key symbols by performing symbol mapping on the present search key index;

generating a plurality of inverse Fourier-transformed symbols by performing inverse Fourier transform of the plurality of search key symbols and the plurality of modified Walsh-Hadamard-transformed search data symbols;

measuring a PAPR of the plurality of inverse Fourier-transformed symbols; and determining an optimum search key index or an optimum key index corresponding to a minimum PAPR of PAPRs corresponding to a plurality of search key indexes.

13. An apparatus for receiving data, the apparatus comprising:

a receiver configured to receive a plurality of digital symbols from a channel through at least one antenna;

a Fourier transformer configured to generates a plurality of Fourier-transformed key symbols and a plurality of Fourier-transformed data symbols by performing Fourier transform on the plurality of digital symbols;

an optimum key index generator configured to generate an optimum key index from the plurality of Fourier-transformed key symbols;

a modified inverse Walsh-Hadamard transformer configured to generate a plurality of modified inverse Walsh-Hadamard-transformed data symbols by performing modified inverse Walsh-Hadamard transform on the plurality of Fourier-transformed data symbols according to a transposed matrix of a modified Walsh-Hadamard matrix that the optimum key index instructs; and a symbol mapper configured to convert the plurality of modified Walsh-Hadamard-transformed data symbols to a plurality of binary data signals.

14. The apparatus of claim 13, wherein the optimum key index generator generates an optimum search key index from the plurality of Fourier-transformed key symbols and generates the optimum key index using a search interval and the optimum search key index.

15. The apparatus of claim 14, further comprising an optimum key combination vector generator configured to generate an optimum key combination vector corresponding to the optimum key index, wherein a modified Walsh-Hadamard matrix that the optimum key index instructs is generated by changing a position of a row or a column of an original Walsh-Hadamard matrix according to the optimum key combination vector.

16. The apparatus of claim 13, wherein the modified inverse Walsh-Hadamard transformer generates a plurality of modified inverse Walsh-Hadamard data symbols by grouping the plurality of Fourier-transformed data symbols into a plurality of data symbol groups and by performing modified inverse Walsh-Hadamard transform on each data symbol group.

17. A method of receiving data in a data receiving apparatus, the method comprising:

receiving a plurality of digital symbols from a channel through at least one antenna;

generating a plurality of Fourier-transformed key symbols and a plurality of Fourier-transformed data symbols by performing Fourier transform on the plurality of digital symbols;

generating an optimum key index from the plurality of Fourier-transformed key symbols;

generating a plurality of modified inverse Walsh-Hadamard-transformed data symbols by performing modified inverse Walsh-Hadamard transform on the plurality of Fourier-transformed data symbols according to a transposed matrix of a modified Walsh-Hadamard matrix that the optimum key index instructs; and converting the plurality of modified Walsh-Hadamard transformed data symbols to a plurality of binary data signals.

18. The method of claim 17, wherein generating the optimum key index comprises:

generating the optimum search key index from the plurality of Fourier-transformed key symbols; and generating the optimum key index using a search interval and the optimum search key index.

19. The method of claim 18, further comprising:

generating an optimum key combination vector corresponding to the optimum key index; and generating a modified Walsh-Hadamard matrix that the optimum key index instructs by changing a position of a row or a column of an original Walsh-Hadamard matrix according to the optimum key combination vector.

20. The method of claim 17, wherein generating the plurality of modified inverse Walsh-Hadamard-transformed data symbols comprises:

grouping the plurality of Fourier-transformed data symbols into a plurality of data symbol groups; and generating the plurality of modified inverse Walsh-Hadamard-transformed data symbols by performing modified inverse Walsh-Hadamard transform on each data symbol group.

* * * * *